United States Patent [19]
Watanabe et al.

[11] Patent Number: 5,090,510
[45] Date of Patent: Feb. 25, 1992

[54] DRIVE CONTROL SYSTEM OF FOUR-WHEEL DRIVE VEHICLE

[75] Inventors: Kenichi Watanabe; Eiji Nishimura; Mitsuru Nagaoka; Kaoru Sotoyama, all of Hiroshima, Japan

[73] Assignee: Mazda Motor Corporation, Hiroshima, Japan

[21] Appl. No.: 591,987

[22] Filed: Oct. 1, 1990

[30] Foreign Application Priority Data

Sep. 30, 1989 [JP] Japan .................................. 1-255963
Sep. 30, 1989 [JP] Japan .................................. 1-255964
Sep. 30, 1989 [JP] Japan .................................. 1-255965

[51] Int. Cl.⁵ .............................................. B60K 28/16
[52] U.S. Cl. ...................................... 180/197; 180/249
[58] Field of Search ............... 180/248, 249, 233, 197; 364/426.02, 424.1, 424.05

[56] References Cited

U.S. PATENT DOCUMENTS

| | | | |
|---|---|---|---|
| 4,709,775 | 12/1987 | Watanabe et al. | 180/233 |
| 4,723,624 | 2/1988 | Kawasaki et al. | 180/247 X |
| 4,738,332 | 4/1988 | Wright | 180/197 |
| 4,889,204 | 12/1989 | Furuya et al. | 180/197 |
| 4,967,869 | 11/1990 | Nagaoka et al. | 180/244 |
| 4,981,190 | 1/1991 | Nakayama et al. | 180/197 |
| 4,985,836 | 1/1991 | Hashiguchi et al. | 364/426.02 |
| 4,991,678 | 2/1991 | Furuya et al. | 180/248 X |

Primary Examiner—Charles A. Marmor
Assistant Examiner—Kevin Hurley
Attorney, Agent, or Firm—Fish & Richardson

[57] ABSTRACT

A drive control system of a four-wheel drive vehicle has a differential device interposed between front and rear wheels and a differential restricting device mounted to the differential device. The differential restricting device is subjected to feedback control so as for the wheels to reach a target slip ratio. In this control, a control target value is given by way of slip ratios of the wheels and the target slip ratios are then converted into a wheel speed difference between the front and rear wheels. The feedback control of the differential restricting device is performed by comparing the target wheel speed difference with an actual wheel speed difference between the front and rear wheels.

8 Claims, 10 Drawing Sheets

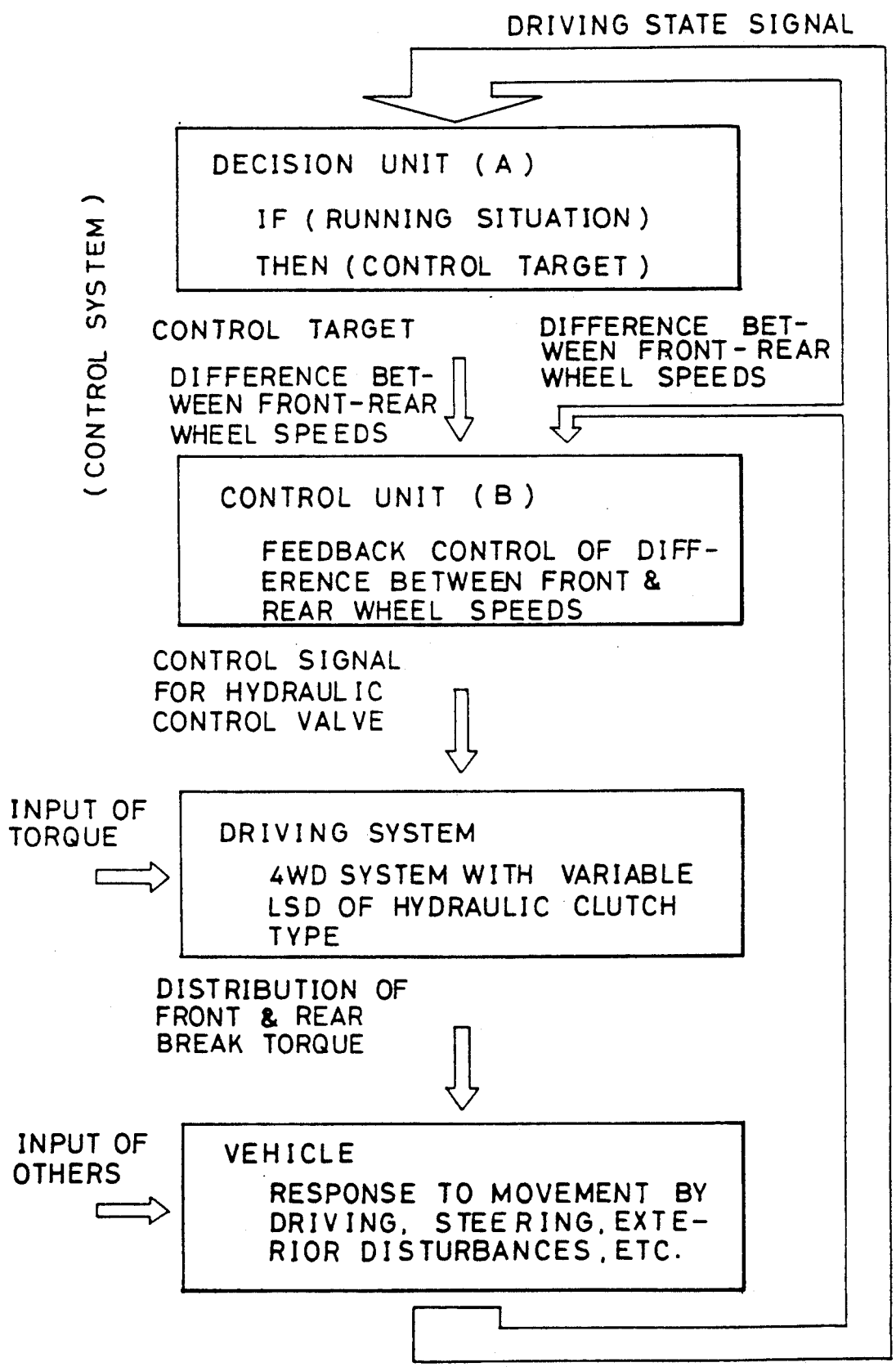

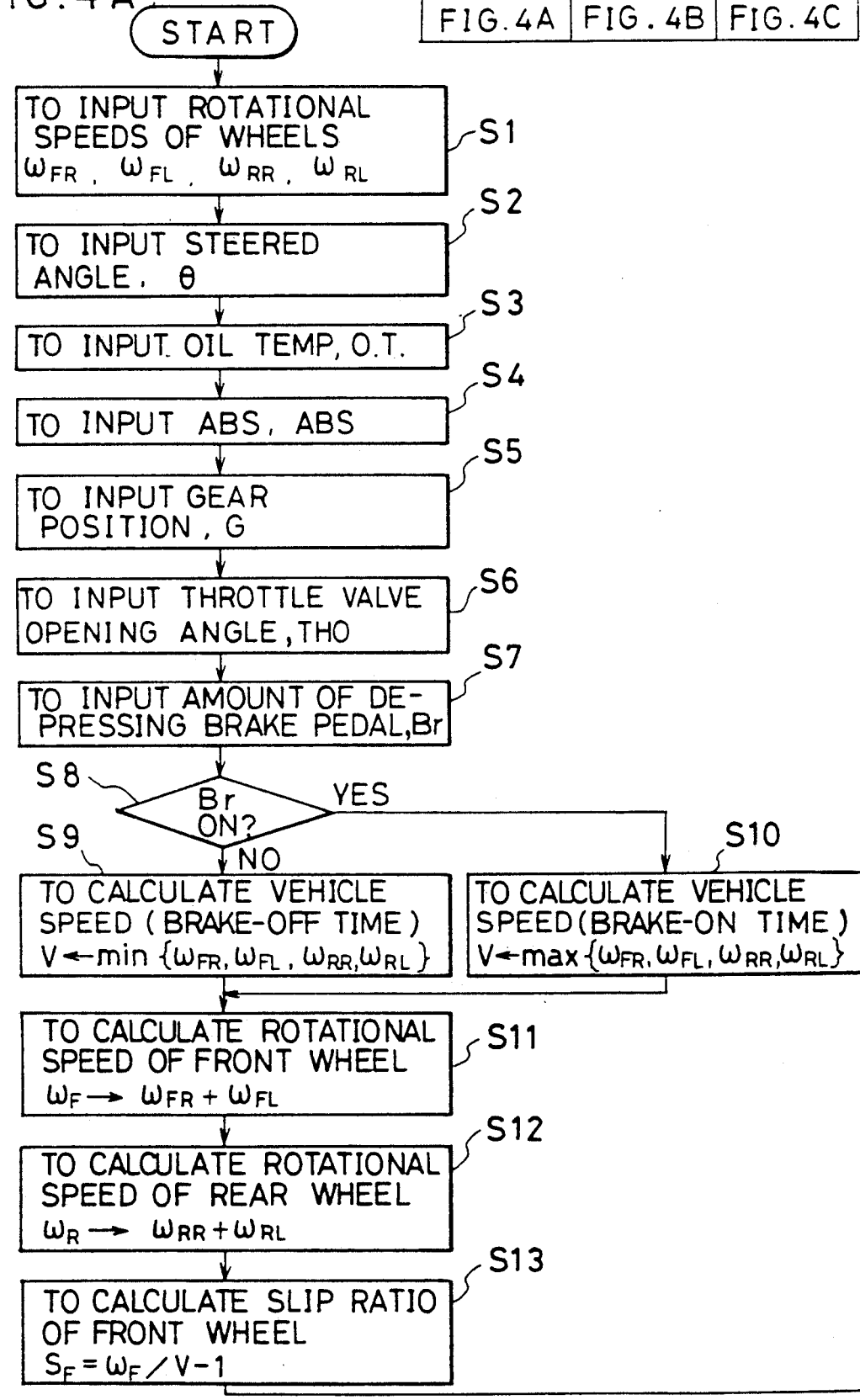

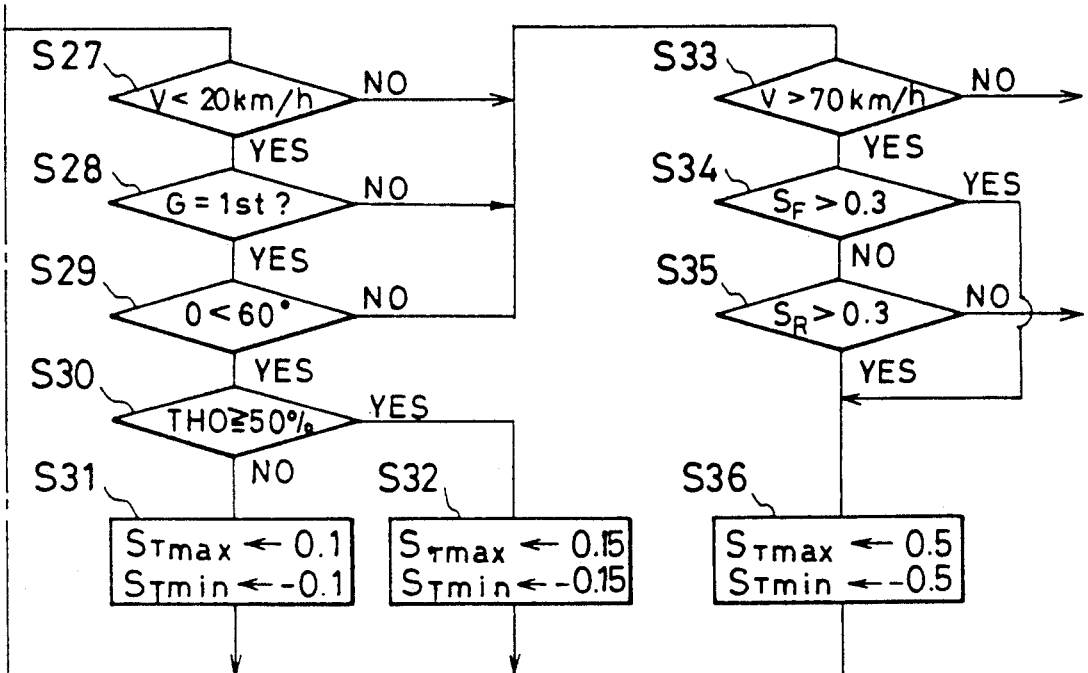

DRIVE CONTROL SYSTEM OF FOUR-WHEEL DRIVE VEHICLE

BACKGROUND OF THE INVENTION

1. Field of the Invention

The present invention relates to a drive control system of a four-wheel drive vehicle in which all of the front and rear wheels are driven and, more particularly, to a slip control of the four-wheel drive vehicle.

2. Description of Related Art

A four-wheel drive vehicle has a center differential gear interposed between front and rear wheels. The disposition of the center differential gear enables the four wheels to drive the vehicle in a stable fashion because a "tight corner brake" phenomenon or the like can be avoided by its differential action.

In instances where the center differential gear is disposed in the four-wheel drive vehicle, however, the problem may arise that driving performance cannot be achieved to a sufficient extent because a total driving force is reduced due to the differential action of the center differential gear, when either of the driven wheels would slip excessively or either of them skids during running on a slippery road or the like.

In order to achieve a sufficient degree of driving performance of the four-wheel drive vehicle, a differential restricting device such as a clutch has been disposed together with the center differential gear, thereby operating the differential restricting device so as to couple the front wheels directly with the rear wheels when the vehicle slips to such an extent that the difference between a from wheel speed (a peripheral front-wheel speed) and a rear wheel speed (a peripheral rear-wheel speed) reaches a value which is equal to or greater than a predetermined value. On the other hand, in other running states, the operation of the differential restricting device is released to thereby allow an operation of the center differential gear.

Japanese Patent Unexamined Publication (kokai) No. 261,539/1987 discloses a four-wheel drive car with such a center differential and a differential restricting device for restricting the operation of the center differential. The technology involved in this four-wheel drive system is arranged such that a microcomputer is adopted for a control unit and data or information on the wheel speeds of the wheels, the steered angle of the steering wheel and so on is inputted into tee control unit as well as wheel speeds of the front and rear wheels and a target speed difference are determined from maps, thereby performing a slip control on the basis of a feedback control of the difference restricting device so as to allow a difference between actual speeds of the front and rear wheels to approach to the target speed difference. In other words, the technology disclosed in this prior patent publication involves the feedback control of the differential restricting device by using the difference of the wheel speeds of the front and rear wheels as a control target value which varies with the steered angle of the steering wheel.

U.S. Pat. No. 4,723,624 discloses the technology which involves turning the clutch as a differential restricting device off when the difference between the wheel speeds of the front and rear wheels reaches a predetermined value.

It is to be noted herein that an object to be controlled originally in a control of the four-wheel drive car is a slip ratio S of the wheels, which functions as one of the big factors governing the behavior of the vehicle body and it is well known that a friction coefficient of a wheel against the surface of a road or a cornering force CF may vary to a great extent with the slip ratio S. Hence, it is most preferred to set the slip ratio S itself as a control target value in controlling the four-wheel drive car. The slip ratio S may be defined herein as follows:

$$S = \frac{\text{wheel peripheral speed}}{\text{vehicle speed}} - 1$$

or $$S = \frac{\text{wheel peripheral speed}}{\text{vehicle speed}}$$

The adoption of the slip ratio S as the control target value, however, presents the following problem. As microcomputers to be used for the control units for the four-wheel drive system for automotive vehicles are generally said to be rather slow in processing the division, the processing of the division may accordingly take a little longer period of time for giving an actual slip ratio S to be compared with a target slip ratio $S_T$ when the slip ratio S which is obtained by the division for giving the actual slip ratio S is set as a target value, thereby causing a delay in performing the control.

Therefore, it is common in conventional technology that the speed difference obtainable by the processing of the subtraction is adopted as a control target value in order to avoid the delay in performing the control. It is to be noted herein that the speed difference (the rotational speed difference between the front and rear wheels) as the control target value is adopted merely as a matter of convenience and it is different in concept from the slip ratio S that should originally be adopted as the control target value.

More specifically, on the one hand, suppose that a speed difference between the wheel speed of the front wheel and the wheel speed of the rear wheel is 10 km per hour while the wheel speed of the rear wheel is approximately equal to the vehicle speed as high as 100 km per hour. In this instance, the slip ratio S is determined to be 0.1. On the other hand, suppose that the speed difference between the wheel speeds of the front and rear wheels is the same as above while the vehicle speed is as high as 50 km per hour, then the slip ratio S is determined to be 0.2. In summary, the slip ratio S may vary even if the speed difference between the front and rear wheels would be the same. In other words, the slip ratio may have the different meaning according to a running state of the vehicle even if the speed difference between the front and rear wheels would be the same.

Japanese Patent Unexamined Publication (kokai) No. 11,431/1988 discloses another technology which uses a speed ratio of the wheel speed of the front wheel to the wheel speed of the rear wheel as a target value for the slip control. This slip control involves a feedback control by comparing the actual-speed ratio with the target speed ratio. It is to be noted herein that the speed ratio adopted in this conventional technology is approximately the same in concept as the slip ratio in performing the slip control. It is to be noted, however, that the speed ratio is to be given by the division of the wheel speed of the front wheel by the wheel speed of the rear wheel, so that the operation processing of the speed ratio requires a time period as long as the slip ratio S, thereby incurring the risk of causing the delay of control. Further, this technology is devised so as to give the target speed ratio from a map so that a large number of maps are prepared so as to correspond to various running conditions in order to provide control characteristics over a wide range containing a variety of running states of the automotive vehicle, such as an "ON" state and an "OFF" state of an anti-lock brake system (ABS system), a tight corner braking requiring a large steered angle of the steering wheel, occurrence of a stuck state of the vehicle, and so on.

Conventionally, the slip control is generally performed by implementing the setting of the target value and the following feedback control in a series of routines, so that a quick control has strongly been desired because a large number of processing steps are required in order to perform the slip control accurately so as to comply with various running states of the vehicle.

SUMMARY OF THE INVENTION

Therefore, the present invention has the object to provide a drive control system for a four-wheel drive automotive vehicle, which is adapted to avoid a delay in control when the slip ratio S to be originally adopted is used as a target value.

In order to achieve the object, the present invention consists of a drive control system of a four-wheel drive vehicle having a differential device interposed between front and rear wheels and a differential restricting device mounted to said differential device for restricting a differential action of said differential device, comprising:

a target slip ratio setting means for setting a target slip ratio of a wheel;

a conversion means for converting the target slip ratio set by said target slip ratio setting means into a target rotational speed difference between the front and rear wheels;

a detection means for detecting a rotational speed difference between the front and rear wheels; and a feedback control means for controlling said differential restricting means so as for said rotational speed difference between the front and rear wheels detected by said detection means to reach said target rotational speed difference between the front and rear wheels.

As described hereinabove, the control target value set in a form of the slip ratio S by the target slip ratio setting means is converted into the difference of the rotational speeds of the front and rear wheels by the conversion means. The rotational speed difference given from the rotational speeds of the front and rear wheels detected by a wheel speed detecting means is compared with the target value converted, thereby determining a manipulated variable of the differential restricting device so as to allow a difference between the actual rotational speeds of the front and rear wheels. In other words, the slip ratio S set as the target value is replaced by the difference between the speeds of the front and rear wheels, and the feedback control is performed by comparing the target difference between the speeds of the front and rear wheels with the difference between the actual speeds of the front and rear wheels. Accordingly, at a stage of the feedback control, namely, at a stage of comparing an actual slip condition of the wheel with the target value, the division which requires a longer time for the operation processing is not involved, so that the drive control system according to the present invention undergoes no restrictions from the use of the slip ratio S as the target value.

In a preferred aspect, the present invention is constructed such that the feedback control means is subjected to processing in a different routine to appropriately perform the feedback control in response to the target value. This construction permits the parallel execution of the setting of the target value and the feedback control on the basis of the target value, thereby providing an improved response to the control and, as a result, avoiding the delay of control even if the various target values would be set in accordance with the running situation of the vehicle.

Other objects, features and advantages of the present invention will become apparent in the course of the description of the preferred embodiments, which follows, in conjunction with the accompanying drawings.

BRIEF DESCRIPTION OF THE DRAWINGS

FIGS. 2(a) to 2(c) are block diagrams showing the construction of a control system according to the embodiment of the present invention.

DESCRIPTION OF THE PREFERRED EMBODIMENTS

The present invention will be described more in detail with reference to the accompanying drawings.

Figure 1:
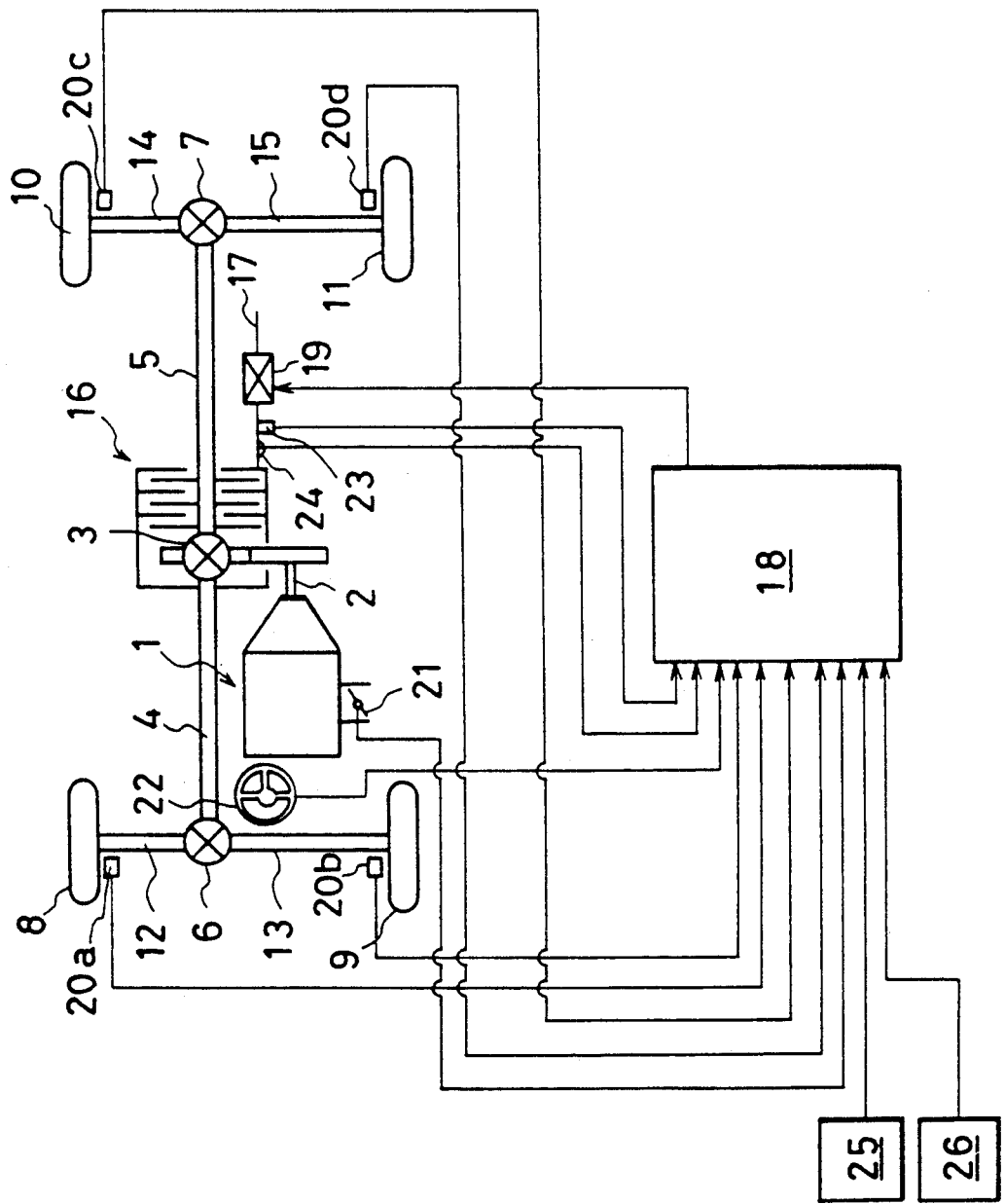
FIG. 1 is a diagrammatic representation of the drive control system of a four-wheel drive vehicle according to an embodiment of the present invention.

FIG. 1 illustrates a whole system showing an embodiment according to the present invention which is applied to an automotive vehicle of a four-wheel drive type. In this embodiment, a power plant 1 consisting of an engine and a transmission is disposed on a front side of the automotive vehicle body in a position parallel to the longitudinal direction of the body, and an output axle 2 of the power plant 1 is disposed so as to extend rearwards up to a generally intermediate portion of the body and gear-coupled to a center differential 3. The center differential 3 has two output sections from one of which a front wheel drive shaft 4 extends forwards and from the other of which a rear wheel drive shaft 5 extends rearwards. To a top end of the front wheel drive shaft 4 are connected a wheel axle 12 of the right-hand front wheel 8 and a wheel axle 13 of the left-hand front wheel 9, on the one hand, through a front differential 6. To a top end of the rear wheel drive shaft 5 are connected a wheel axle 14 of the right-hand rear wheel 10 and a wheel axle 15 of the left-hand rear wheel 11, on the other hand, through a rear differential 7.

The center differential 3 is provided with a hydraulic pressure clutch 16 for restricting the differential action of the center differential 3. The hydraulic pressure clutch 16 is communicated with a hydraulic pressure passageway 17 for supplying the coupling hydraulic pressure to the hydraulic pressure clutch 16, and the hydraulic pressure passageway 17 has a hydraulic pressure control valve 19 which is subjected to duty control by a controller 18.

The vehicle body has rotational speed sensors 20a, 20b, 20c and 20d disposed at the four wheels 8, 9, 10 and 11, respectively, and the rotational speed sensors 20a to 20d, inclusive, are to sense the rotational speeds of the respective wheels 8 to 11. Signals detected by the rotational speed sensors 20a to 20d are inputted into the controller 18.

The controller 18 is further fed with a signal indicative of a throttle valve opening angle from a throttle valve opening angle sensor disposed at a throttle valve 21 of the engine, a signal indicative of a steered angle from a steered angle sensor for sensing an angle at which a steering wheel 22 is operated or steered, i.e., a steered angle of the steering wheel 22, a signal indicative of a hydraulic pressure from a hydraulic pressure sensor 23 disposed at the hydraulic pressure passageway 17, and a signal indicative of an oil temperature from an oil temperature sensor 24. Furthermore, the controller 18 is fed with an ABS signal, i.e., a signal indicative of an anti-lock brake system (ABS), from an ABS controller 25 for controlling the anti-lock brake system (ABS) and a signal indicative of the position of a gear from an EAT controller 26 functioning as a control device of an electronically controllable automatic transmission (EAT), among others.

Figure 2B:
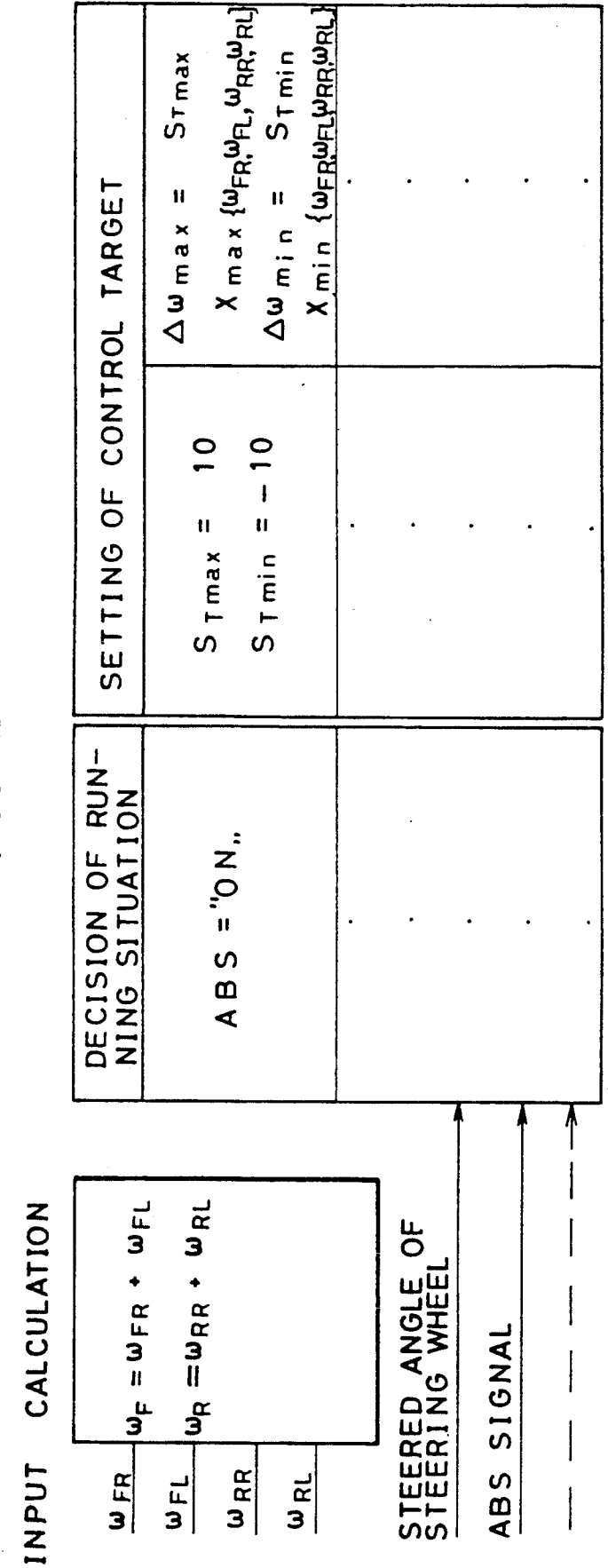

FIG. 2(a) is a block diagram illustrating an overall layout of the control system in the control system according to the present invention. As shown in FIG. 2(a), the control system is roughly broken down into two sections, i.e., a decision unit (A) and a control unit (B). Into the decision unit (A) enter various signals indicative of driving states of the vehicle body, and the decision unit (A) may calculate a front wheel speed $\omega_F$ from rotational speeds $\omega_{FR}$ and $\omega_{FL}$ of the respective right-hand and left-hand front wheels 8 and 9 and a rear wheel speed $\omega_R$ from rotational speeds $\omega_{RR}$ and $\omega_{RL}$ of the respective right-hand and left-hand rear wheels 10 and 11. Further, the decision unit (A) presumes a vehicle speed V from the lowest rotational speed or the highest rotational speed of the rotational speeds of the four wheels 8 to 11, inclusive, and calculates a ratio S of the front wheel speed to the rear wheel speed and a difference, $\Delta\omega$, between the front and rear wheel speeds, from the front wheel speed $\omega_F$ and the rear wheel speed $\omega_R$. And the decision unit (A) makes a decision to determine various running situations on the basis of the input signals and the values obtained by the above calculation. The running situations may include, for example, the situations in which the anti-lock brake system (ABS) is "ON" or not, in which the vehicle is at the time of anti-lock braking or not, in which the vehicle is stuck or not, in which the vehicle is at the time of acceleration or not, and so on. The decision unit (A) then set the control target value in accordance with each of the running situations, and the control target value is set in a form of the upper limit $S_{Tmax}$ and the lower limit $S_{Tmin}$ of the slip ratio S, except for the control over the situation wherein the vehicle is stuck. It is to be noted herein that the upper limit target slip ratio $S_{Tmax}$ is a set value which is set when the front wheel speed $\omega_F$ is greater than the rear wheel speed $\omega_R$ and that it defines the upper limit of a non-reactive region as will be described more in detail thereinafter. It is further noted herein that the lower target slip ratio $S_{Tmin}$ is a set value which is set when the rear wheel speed $\omega_R$ is greater than the front wheel speed $\omega_F$ and that it likewise defines the lower limit of the non-reactive region. The upper limit target slip ratio $S_{Tmax}$ and the lower limit target slip ratio $S_{Tmin}$ are multiplied by the front wheel speed $\omega_F$ or the rear wheel speed $\omega_R$, whichever is larger (in some running situations, whichever is smaller), thereby converting them into an upper limit target value, $\Delta\omega max$, and a lower limit target value, $\Delta\omega min$, for the difference between the rotational speeds of the front and rear wheels, respectively. For the control of the stuck state of the vehicle body or other situations, the upper limit target value, $\Delta\omega max$, and the lower limit target value, $\Delta\omega min$, for the rotational speed difference between the front and rear wheels are directly set.

Figure 2C:
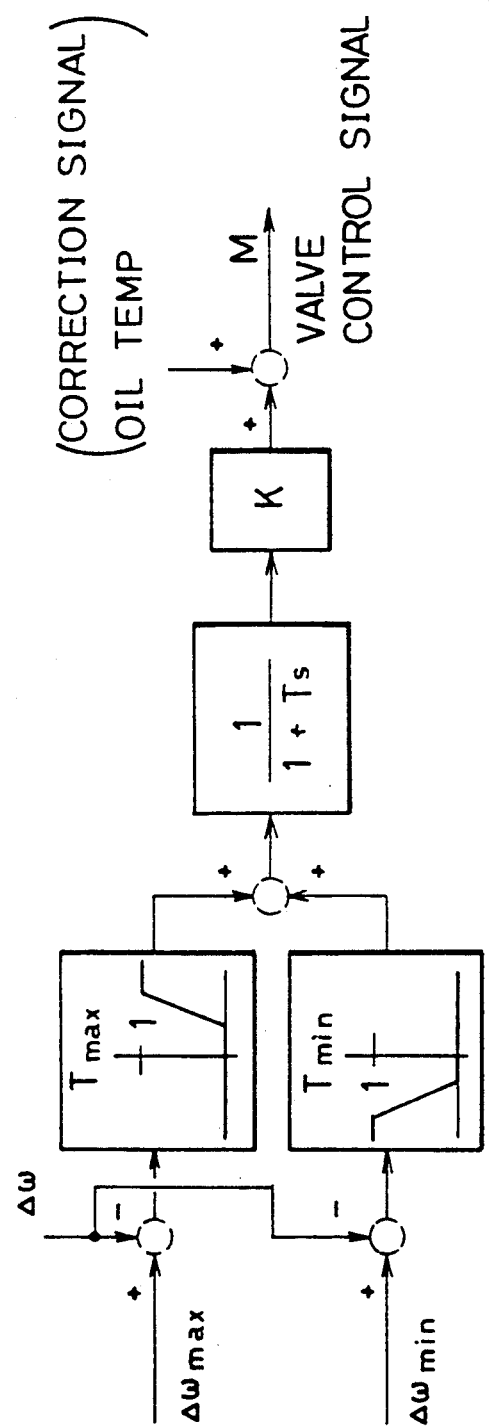
Figure 3:
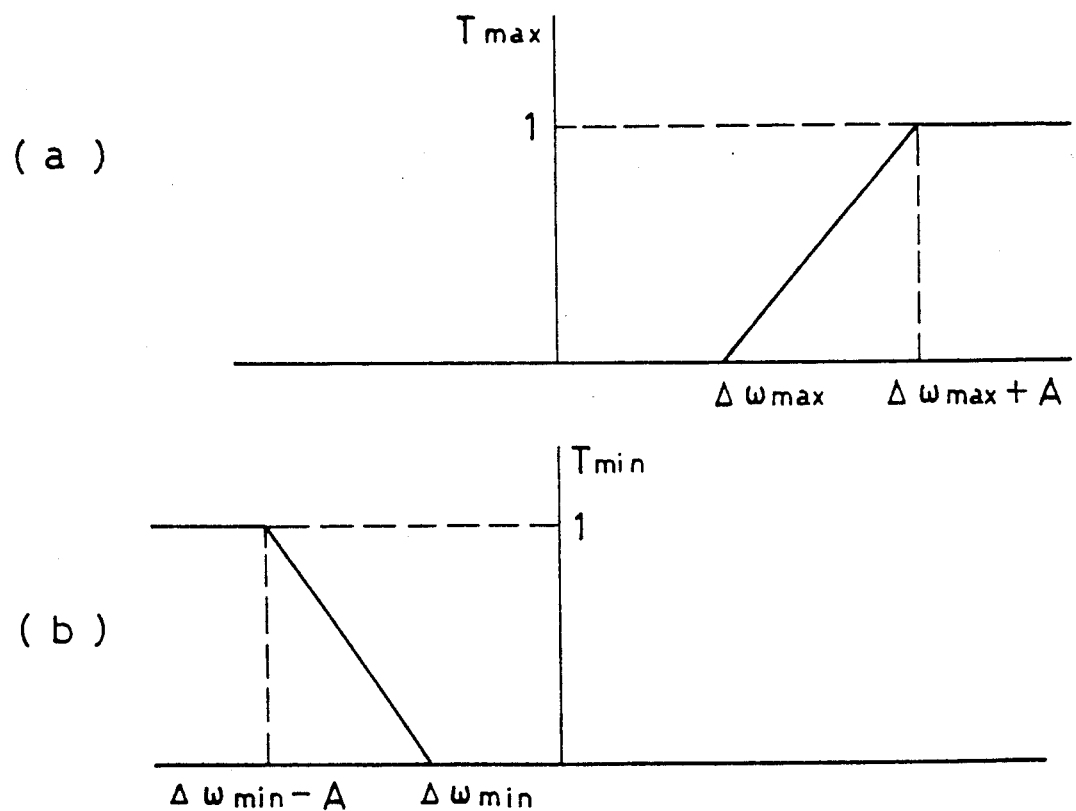
FIG. 3 is a characteristic view of the control according to the embodiment of the present invention.

FIG. 2(c) is a block diagram illustrating the detail of the control unit (B) and FIG. 3 is a graph illustrating the control characteristics to be defined in the control unit (B). The control unit (B) is fed with the upper and lower limit target values, $\Delta\omega max$ and $\Delta\omega min$, of the rotational speed difference set by the decision unit (A) as described hereinabove. The control unit (B) sets a target value Tmax (when the front wheel speed $\omega_F$ is greater than the rear wheel speed $\omega_R$) for the clutch oil pressure to zero if a difference, $\Delta\omega$, between the actual rotational speeds of the front and rear wheels does not exceed the upper limit target value $\Delta\omega max$, or the control unit (B) alternatively sets a target value Tmin (when the rear wheel speed $\omega_R$ is greater than the front wheel speed $\omega_F$) for the clutch oil pressure to zero if the difference $\Delta\omega$ between the actual rotational speeds thereof does not exceed the lower limit target value $\Delta\omega min$. In either case, a free differential action of the center differential 3 is allowed. When the difference $\Delta\omega$ between the actual rotational speeds thereof exceeds the upper limit target value $\Delta\omega max$, the target value Tmax for the clutch oil pressure is varied linearly with the difference between the difference $\Delta\omega$ and the limit target value $\Delta\omega max$. Likewise, when the difference $\Delta\omega$ between the actual rotational speeds thereof exceeds the lower limit target value $\Delta\omega min$, the target value Tmin for the clutch oil pressure is varied linearly with the difference between the difference $\Delta\omega$ and the lower limit target value $\Delta\omega min$. In other words, a proportional control is performed so as to make a region defined by the upper limit target value $\Delta\omega max$ and the lower limit target value $\Delta\omega min$, and a limiter is allowed to work so as to make the hydraulic pressure the maximum pressure when the difference between the difference $\Delta\omega$ between the actual rotational speeds thereof and the upper limit target value $\Delta\omega max$ exceeds a constant limit or when the difference between the difference $\Delta\omega$ and the lower limit target value $\Delta\omega min$ exceeds a constant limit, Then, the control unit (B) gives a signal T indicative of the sum of the upper limit target clutch oil pressure Tmax and the lower limit target clutch oil pressure Tmin, and this signal T is multiplied by a gain K after a predetermined delay time has elapsed, thereby determining a control amount M of the hydraulic pressure control valve 19 so as for the coupling hydraulic pressure to reach a maximum level when the signal T is maximum. This control amount M is corrected by a correction signal such as an oil temperature or the like and then generated as a valve control signal.

When the control system is broken down into the decision unit (A) and the control unit (B) and each of the units is processed by the individual and separate routines in the manner as will be described hereinafter, the processing of the decision unit (A) is performed in the main routine while the processing of the control unit (B) is executed in short time intervals by the interrupt processing. More specifically, the interrupt processing is implemented into the decision unit (A) in each cycle in which the amount of operating the control unit (B) is outputted, and the feedback control of the control unit (B) is executed in response to the target value at the time of an interrupt.

As described hereinabove, stability of the control can be improved by conversion of the target slip ratio into the difference between the front and rear wheel speeds, and various control characteristics can easily be set by setting the control target values in a form of the upper limit and lower limit values according to the running states.

In this specific embodiment, the slip ratio S as defined hereinabove is converted into the rotational speed difference $\Delta\omega$ and generated to the control unit (B), so that the rotational speed difference $\Delta\omega$ can readily be compared with an actual driving state that can be seen in a form of the rotational speed difference. This can shorten a period of time for processing the control.

Further, the drive control system according to the present invention can readily provide a variety of control characteristics by setting the upper limit target value $\Delta\omega max$ and the lower limit target value $\Delta\omega min$ and performing the control so as to define a non-reactive region by the upper limit target value $\Delta\omega max$ and the lower limit target value $\Delta\omega min$. In other words, the provision of such a non-reactive region permits the various running situations to be decided and the target slip ratios in accordance with the running situations to be set in a manner as will be described hereinafter. Accordingly, this can readily change characteristics for the slip control into various modes. For instance, the characteristics in the region which exceeds the upper limit target value $\Delta\omega max$ or the lower limit target value $\Delta\omega min$ can be changed into various forms such as a curve of secondary degree or the like. Further, a change can easily be made in broadening a lock region or a free region by altering the upper limit target value $\Delta\omega max$ or the lower limit target value $\Delta\omega min$.

Description will now be made in more detail of the control of the embodiment as described hereinabove.

Figure 4B:
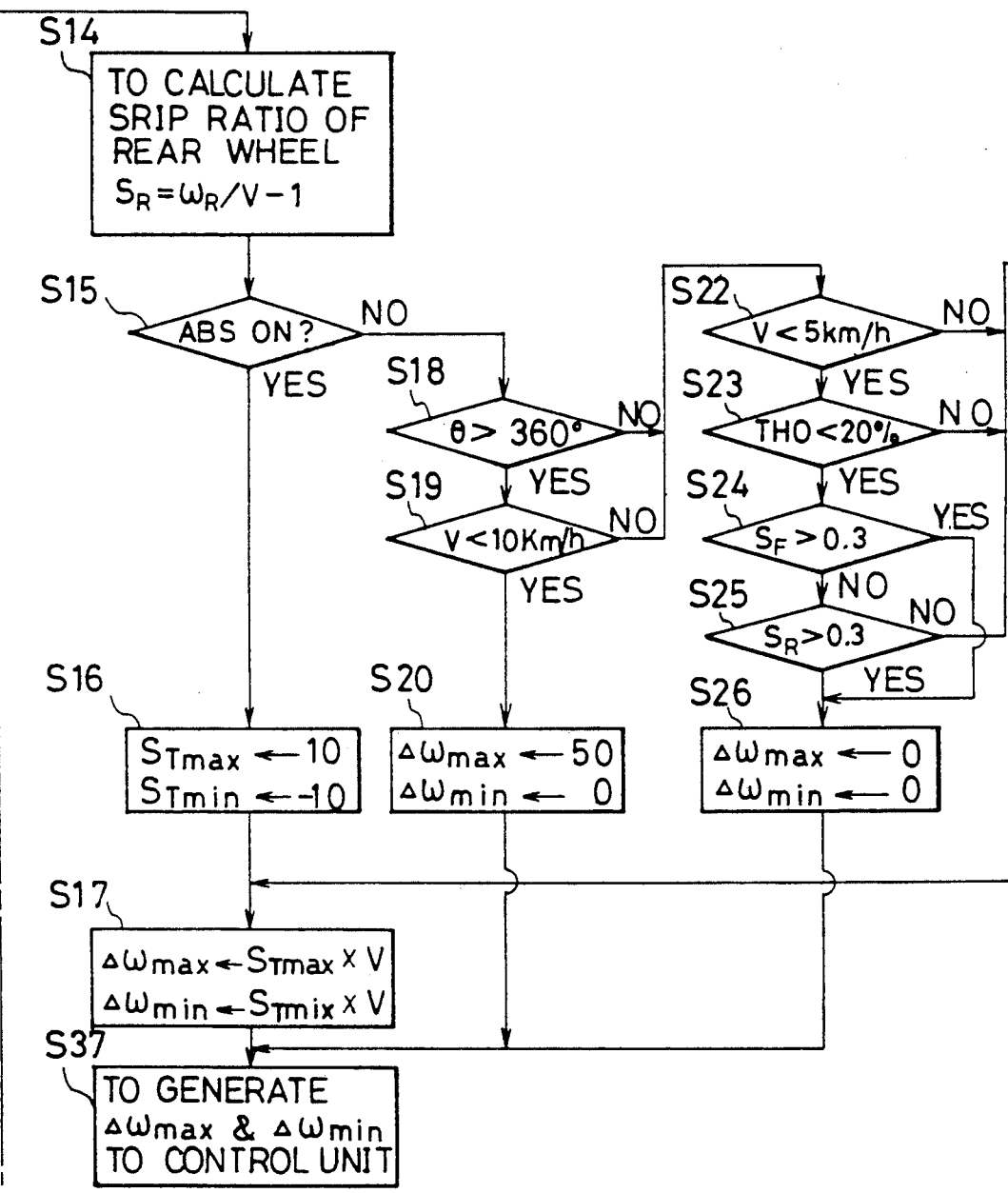
FIGS. 4 and 5 are flow charts showing an example of the control.

FIG. 4 is a flowchart for executing an input unit and the decision unit (A).

As shown in FIG. 4, the system has been started, followed by proceeding to step S1 at which the rotational speeds of the four wheels, $\omega_{FR}$, $\omega_{FL}$, $\omega_{RR}$ and $\omega_{RL}$, of the right-hand and left-hand front wheels 8 and 9 and the right-hand and left-hand rear wheels 10 and 11, respectively, are inputted. Then at step S2, the steered angle, $\theta$, of the steering wheel is inputted, and at step S3 the oil temperature O.T. is inputted. Thereafter, at step S5, the ABS signal is inputted, followed by the input of the gear position G at step S5, the throttle valve opening angle signal THO at step S6, and the signal indicative of the depressed amount of the brake pedal at step S7. Then, the program flow goes to step S8 at which a decision is made to determine whether or not a brake switch Br is turned on. As is known, the brake switch Br is turned on or assumes an "ON" state as the foot brake pedal is depressed while the brake switch Br is turned off or assumes an "OFF" state as the foot brake pedal is released.

The processing from step S8 to step S10 is to presume the vehicle speed V of the vehicle body. In this presumption processing, first at step S8, it is decided to determine if the brake switch Br is in an "ON" state. When the result of decision at step S8 indicates that the brake switch Br is not in the ON state, or the brake switch Br is turned off on the one hand, it is determined that the vehicle is not in a state of being braked so that the program flow proceeds to step S9 at which the lowest rotational speed among the rotational speeds of the four wheels 8 to 11, inclusive, i.e., $\omega_{FR}$, $\omega_{FL}$, $\omega_{RR}$ and $\omega_{RL}$, respectively, is set as the vehicle speed V. More specifically, at the time of non-braking, i.e., accelerating or running at a stationary speed, the wheels 8 to 11 have the tendency of spinning—in other words, all the rotational speeds of the wheels are rather greater than the actual vehicle speed—so that the slowest rotational speed of the wheel is presumed as the vehicle speed V. On the other hand, when the result of decision at step S8 indicates that the brake switch Br is in the "ON" state, i.e., when the vehicle is being braked, all the wheels 8 to 11, inclusive, assume the tendency of being locked—in other words, the rotational speeds of the wheels are rather slower than the actual vehicle speed—so that the program flow proceeds to step S10 at which the highest rotational speed of the wheel among the rotational speeds of the four wheels 8 to 11, i.e., $\omega_{FR}$, $\omega_{FL}$, $\omega_{RR}$ and $\omega_{RL}$ is presumed as the vehicle speed V. After steps S9 and S10, the program flow goes to step S11 at which the front wheel rotational speed $\omega_F$ is calculated by adding the rotational speed of the right-hand front wheel 8, $\omega_{FR}$, and the rotational speed of the left-hand front wheel 9, $\omega_{FL}$, followed by proceeding to step S12 at which the rear wheel rotational speed $\omega_R$ is calculated by adding the rotational speeds of the right-hand and left-hand rear wheels 10 and 11, $\omega_{RR}$ and $\omega_{RL}$, respectively.

Thereafter, the program flow goes to step S13 at which a slip ratio $S_F$ for the front wheels 8 and 9 is obtained by the following formula:

$$S_F = \frac{\omega_F}{V} - 1$$

Then, at step S14, a slip ratio $S_R$ for the rear wheels 10 and 11 is obtained by the following formula:

$$S_R = \frac{\omega_R}{V} - 1$$

Description will then be made on the decision of the running states with reference to the flowchart as shown in FIG. 4.

ABS = "ON" (Steps S15 and S16)

After step S14, the program flow goes to step S15 at which the anti-lock brake system (ABS) is in an "ON" state, i.e., the ABS is turned on. If the ABS is in the ON state, on the one hand, the program flow goes to step S16 at which the upper limit target slip ratio $S_{Tmax}$ is set to a value which is sufficiently large, for example, to 10, while the lower limit target slip ratio $S_{Tmin}$ is set to a value that is for example as low as $-10$. As the function as the ABS does not work in such a state that the free differential action of the center differential 3 is allowed, namely, that the ABS control is not interfered by the wheels 8 to 11, inclusive, a large target slip ratio $S_T$ is given.

Then the program flow goes to step S17 at which the the upper limit target slip ratio $S_{Tmax}$ is multiplied by the vehicle speed V, thereby converting the target slip ratio $S_{Tmax}$ into the upper limit target rotational speed difference $\Delta\omega max$ between the front and rear wheels, while the lower limit target slip ratio $S_{Tmin}$ is likewise multiplied by the vehicle speed V, thereby converting the target slip ratio $S_{Tmin}$ into the lower limit target rotational speed difference $\Delta\omega min$ between the front and rear wheels. Thereafter, the program flow goes to step S37 at which the upper and lower limit target rotational speed differences Δωmax and Δωmin, respectively, are outputted to the control unit (B).

Tight Cornering (Steps S18 to S20)

When the result of decision at step S15 indicates that the ABS is not in the ON state, then the decision is made to determine whether the situation is such that the tight corner braking is to be controlled.

After step S15, then the program flow goes to step S18 at which a decision is made to determine if the steered angle $\theta$ of the steering wheel is larger than a predetermined angle, for example, if the steered angle thereof, $\theta$, is larger than 360°. When the result of decision at step S18 indicates that the steered angle thereof $\theta$ is larger than the predetermined angle, then the program flow goes to step S19 at which it is decided to determine if the vehicle speed is smaller than 10 km per hour.

When the result of decision at step S19 indicates that the vehicle speed V is slower than 10 km per hour, on the one hand, it is decided that the difference between the wheels on the inner side of the vehicle is larger than the difference between the wheels on the outer side thereof, thereby assuming the situation in which tight corner braking is being caused to occur. In this case, accordingly, a larger rotational speed is provided on the wheels on the front side of the vehicle, and the program flow goes to step S20 at which the upper limit target rotational speed difference Δωmax is set to 50, for example, while the lower limit target rotational speed difference Δωmin is set to zero, followed by proceeding to step S37 at which the upper and lower target rotational speed differences Δωmax and Δωmin, respectively, are generated to the control section (B).

Stuck State (Steps S22 to S26)

When the result of decision at the previous step S18 indicates that the steered angle of the steering wheel, $\theta$, is larger than 360°, i.e., that the steered angle thereof, $\theta$, is equal to or smaller than 360°, or when the result of decision at the previous step S19 indicates that the vehicle speed V is not slower than 10 km per hour, i.e., that the vehicle speed V is equal to or faster than 10 km per hour, then the program flow goes to processing steps where the control over the stuck state of the vehicle is required.

In this case, at step S22, a further decision is made to determine if the vehicle speed V is slower than 5 km per hour. If the result of decision at step S22 indicates that the vehicle speed V is smaller than 5 km per hour, the program flow goes to step S23 at which it is decided to determine if the throttle valve opening angle THO is smaller than 20%. When the result of decision at step S23 indicates that the throttle valve opening angle THO is smaller than 20%, then the program flow goes to step S24 at which the front wheel slip ratio $S_F$ is larger than 0.3. If the result of decision at step S24 indicates that the front wheel slip ratio $S_F$ is larger than 0.3, that is, when the vehicle speed V is slower than 5 km per hour, the throttle valve opening angle THO is smaller than 20%, and the front wheel slip ratio $S_F$ is larger than 0.3, it is decided that the front wheels 8 and 9 are stuck, so that the program flow goes to step S26 at which the upper and lower limit target rotational speed differences, Δωmax and Δωmin, respectively, are set each to zero so as to couple the front wheels directly to the rear wheels. Likewise, at step S25 after step S24, a decision is made to determine if the rear wheel slip ratio $S_R$ is larger than 0.3. When the result of is larger than 0.3. When the result of decision at step S25 indicates that the rear wheel slip ratio $S_R$ is greater than 0.3, it is decided that the rear wheels 10 and 11 are stuck so that the program flow goes to step S26 at which the upper and lower limit target rotational speed differences, Δωmax and Δωmin, respectively, are set each to zero. Then, the program flow goes to step S37. In other words, when either of the front wheels 8 and 9 or the rear wheels 10 and 11 are stuck leading to a state in which a large extent of a slip has occurred, the front and rear wheels are caused to assume the tendency of being locked, thereby attempting to escape from the stuck state. It is to be noted herein that the reason for directly setting the target rotational speed differences Δωmax and Δωmin between the front and rear wheels without setting the target slip ratio $S_T$ at step S20 or S26 is because, if the front and rear wheels are in a locked or free state, sufficient performance can be achieved in instances where the tight corner braking occurs or the vehicle is stuck. This also serves as shortening a period of time required for calculation.

Acceleration (Steps S27 to S32)

When it is decided that the vehicle speed V is equal to or larger than 5 km per hour at step S22, that the the throttle valve opening angle is equal to or larger than 20% at step S23 and the slip ratio S is equal to or smaller than 2 at steps S24 and S25, then the program flow goes to processing steps where the necessity of control over acceleration of the vehicle is decided.

In this case, at step S27, a further decision is made to determine if the vehicle speed V is slower than 20 km per hour. If the result of decision at step S27 indicates that the vehicle speed V is slower than 20 km per hour, then the program flow goes to step S28 at which a decision is made to determine if the gear position G is in the first speed range.

When it is decided at step S28 to determine that the gear position G is in the first speed range, the program flow goes to step S29 and a decision is made there to determine if the steered angle of the steering wheel, $\theta$, is smaller than 60°. If the result of decision at step S29 indicates that the steered angle of the steering wheel, $\theta$, is smaller than 60°, then a further decision is made at step S30 to determine if the throttle valve opening angle THO is equal to or larger than 50%. If it is decided at step S30 that the throttle valve opening angle THO is smaller than 50%, the program flow goes to step S31 at which the upper limit target slip ratio $S_{Tmax}$ is set to 0.1 while the lower limit target slip ratio $S_{Tmin}$ is set to −0.1, because this case involves the acceleration of the vehicle with a low throttle valve opening angle. On the other hand, when the result of decision at step S30 indicates that the throttle valve opening angle THO is equal to or larger than 50%, then the program flow goes to step S32 at which the upper limit target slip ratio $S_{Tmax}$ is set to 0.15 while the lower limit target slip ratio $S_{Tmin}$ is set to −0.15 because this case involves the acceleration with a large opening angle, i.e., a rapid start of the vehicle. This is based on the experimental result that, when the vehicle is accelerated with the large opening angle of the throttle valve, a larger slip amount of the wheels is found to be superior in acceleration to the small opening angle thereof (slower acceleration).

The target slip ratios $S_{Tmax}$ and $S_{Tmin}$ set at steps S31 and S32 are transferred to step S17 at which they are converted into the target rotational speed differences, $\Delta\omega$max and $\Delta\omega$min, between the front and rear wheels, respectively, followed by proceeding to step S37.

High-speed running (Steps S33 to S36)

When it is decided at either step that the vehicle speed V is equal to or slower than 20 km per hour at step S27, the gear position is in the speed range other than the first speed range at step S28 or the steered angle of the steering wheel, $\theta$, is equal to or greater than 60°, then a decision is made to determine if the control be made over running at a high speed.

In this case, a further decision is made at step S33 to determine if the vehicle speed V is greater than 70 km per hour, for example. If the result of decision at step S33 indicates that the vehicle speed V is greater than 70 km per hour, i.e., that the vehicle is running at a high speed faster than as high as 70 km per hour or larger, then the program flow goes to step S34 at which a decision is made to determine if the front wheel slip ratio $S_F$ is larger than 0.3. When it is decided at step S34 that the front wheel slip ratio $S_F$ is not larger than 0.3, then the program flow goes to step S35 at which a further decision is made to determine if the rear wheel slip ratio $S_R$ is greater than 0.3. When the result of decision at step S35 indicates that the rear wheel slip ratio $S_R$ is greater than 0.3, then the program flow proceeds to step S36 at which the upper limit target slip ratio $S_{Tmax}$ is set to 0.5 while the lower limit target slip ratio $S_{Tmin}$ is set to $-0.5$ in order to allow a differential action to some extent.

If the result of decision at step S34 indicates that the front wheel slip ratio $S_F$ is greater than 0.3, then the program flow goes directly to step S36 without passing through step S35.

When the running situation is one other than those described herein, the program flow advances for determining the other running situation although not shown herein and the system according to the present invention can set various control target values according to the other running situations.

As have been described hereinabove, the upper and lower limit target values $\Delta\omega$max and $\Delta\omega$min obtained by conversion of the target slip ratios are then generated to the control unit (B) at step S37.

Figure 5:
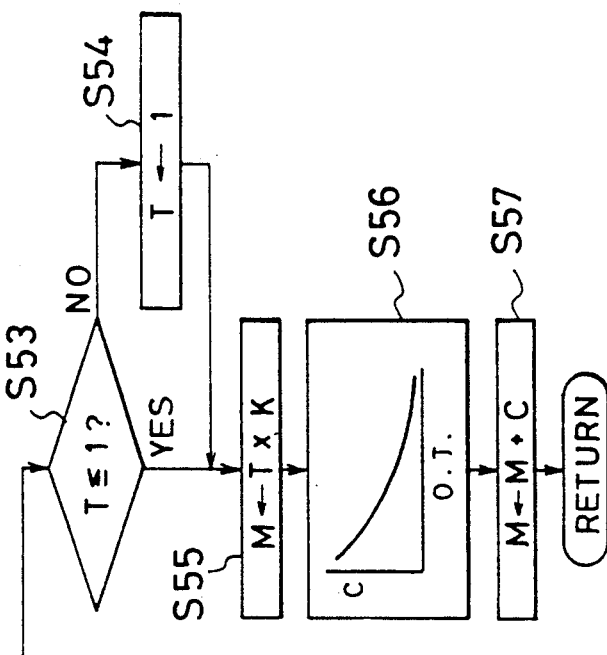
Figure 5:
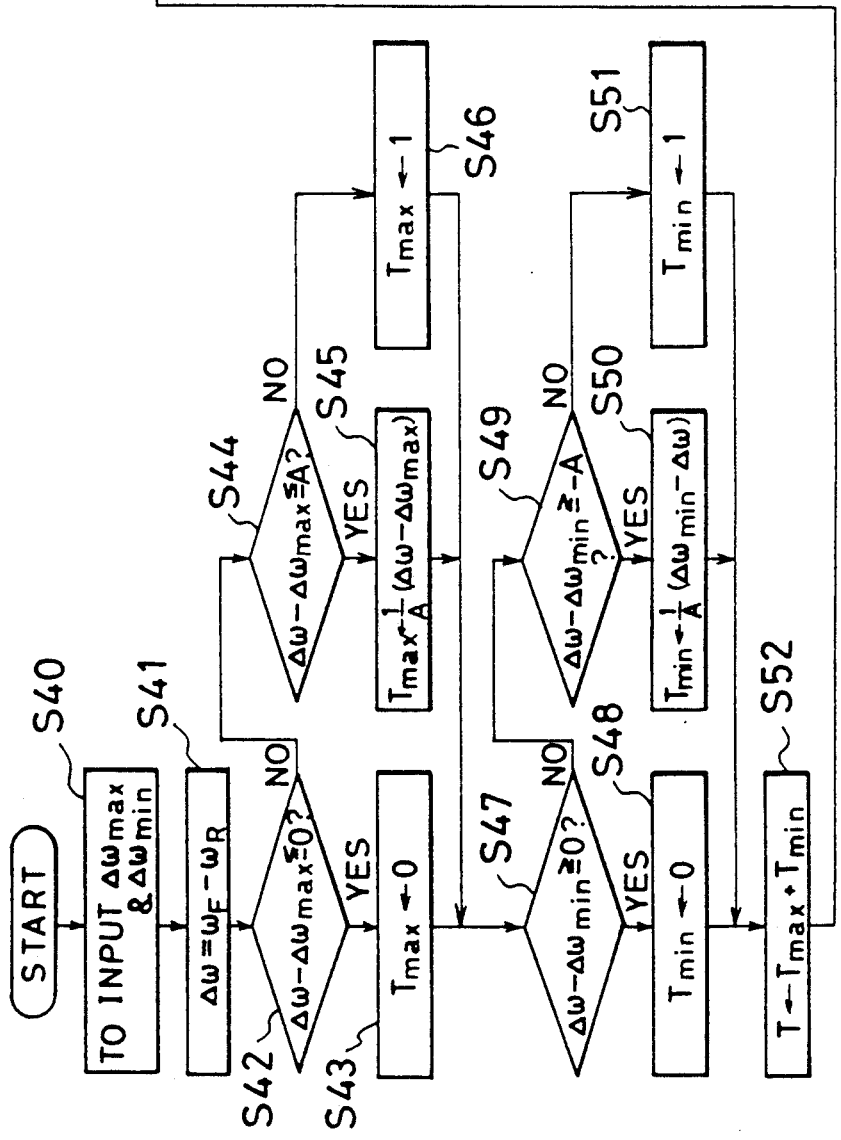

Description will now be made of the execution of the processing by the control unit (B) with reference to the flowchart of FIG. 5.

After the system has been started, at step S40, the upper and lower limit target values $\Delta\omega$max and $\Delta\omega$min obtained at step S37 were inputted, followed by proceeding to step S41 at which the wheel speed difference $\Delta\omega$ between the actual wheel speeds of the front and rear wheels is inputted. Then, at step S42, a decision is made to determine if the wheel speed difference $\Delta\omega$ exceeds the upper limit target value $\Delta\omega$max. If the result of decision at step S42 indicates that the wheel speed difference $\Delta\omega$ does not exceed the upper limit target value $\Delta\omega$max, i.e., the difference obtained by subtracting the upper limit target value $\Delta\omega$from the wheel speed difference $\Delta\omega$ is equal to or smaller than zero, then the program flow goes to step S43 at which the upper limit target value Tmax for the clutch oil pressure is set to zero according to the characteristic as shown in FIG. 3(a). Then the program flow goes to step S47.

When the result of decision at step S42 indicates that the wheel speed difference $\Delta\omega$ exceeds the upper limit target value $\Delta\omega$max, i.e., the difference obtained by subtracting the upper limit target value $\Delta\omega$max from the wheel speed difference, $\Delta\omega$ is larger than zero, then the program flow proceeds to step S44 at which a decision is made to determine whether or not the difference obtained by subtracting the upper limit target value $\Delta\omega$max from the wheel speed difference $\Delta\omega$ is equal to or smaller than a constant limit A ($\Delta\omega - \Delta\omega$max$\leq$A). If the result of decision at step S44 indicates that the difference obtained subtracting the upper limit target value $\Delta\omega$max from the wheel speed difference $\Delta\omega$ is equal to or smaller than the constant limit A, it is then decided at step S45 that the upper limit target value Tmax for the clutch oil pressure is set in a form of the following formula:

Tmax = 1/$A$ × ($\Delta\omega - \Delta\omega$max).

Thereafter, the program flow goes to step S47.

On the other hand, when the result of decision at step S44 indicates that the difference obtained by subtracting the upper limit target value $\Delta\omega$max from the wheel speed difference $\Delta\omega$ is larger than constant limit A, the remitter is caused to work and the upper limit target value Tmax is restricted to "1" at step S46, followed by proceeding to step S47.

Then, at step S47, a decision is made to determine if the wheel speed difference $\Delta\omega$ is equal to or larger than the lower limit target value $\Delta\omega$min. When the result of decision at step S47 indicates that the wheel speed difference $\Delta\omega$ is equal to or larger than the lower limit target value $\Delta\omega$min, i.e., the difference obtained by subtracting the lower limit target value $\Delta\omega$min from the wheel speed difference $\Delta\omega$is equal to or larger than zero ($\Delta\omega - \Delta\omega$min$\geq$0), the program flow goes to step S48 at which the lower limit target value Tmin for the clutch oil pressure is set to zero according to the characteristic as shown in FIG. 3(b), followed by proceeding to step S52 as will be described hereinafter.

On the other hand, at step S47, when the result of decision indicates that the wheel speed difference $\Delta\omega$ is smaller than the lower limit target value $\Delta\omega$min, then the program flow goes to step S49 at which a decision is further made to determine whether the difference obtained by subtracting the lower limit target value $\Delta\omega$min from the wheel speed difference $\Delta\omega$ is equal to or larger than a constant limit $-A$ ($\Delta\omega - \Delta\omega$min$\geq -A$). If the result of decision at step S49 indicates that the difference obtained by subtracting the lower limit target value $\Delta\omega$min from the wheel speed difference $\Delta\omega$ is equal to or smaller than the constant limit $-A$, it is then decided at step S50 that the lower limit target value Tmin for the clutch pressure is set in a form of the following formula:

Tmin = 1/$A$ × ($\Delta\omega$min $- \Delta\omega$).

Thereafter, the program flow goes to step S52.

On the other hand, when the result of decision at step S49 indicates that the difference obtained by subtracting the lower limit target value $\Delta\omega$min from the wheel speed difference $\Delta\omega$ is is smaller than constant limit $-A$, the limiter is caused to work and the lower limit target value Tmin is restricted to "1" at step S51, followed by proceeding to step S52.

Then, at step S52, the target value T for the clutch oil pressure is obtained by adding the upper limit target value Tmax and the lower limit target value Tmin, followed by proceeding to step S53 in order to restrict the target value T for the clutch oil pressure to one or less by the action of the remitter. In other words, a decision at step S53 is made to determine if the target value T is equal to or smaller than 1 and the control amount M for the clutch oil pressure is obtained at step S55 by multiplying the target value T for the clutch oil pressure by a gain K. If the result of decision at step S53 indicates that the target value T for the clutch oil pressure in larger than 1, then the program flow goes to step S54 at which the target value T is set to one by the aid of the limiter, followed by proceeding to step S55.

At steps S56 and S57 after step S55, the control amount M for the clutch oil pressure is then corrected by a correction value C from an oil temperature O.T. to thereby give a final control amount T, followed by the return of the program flow.

Figure 6:
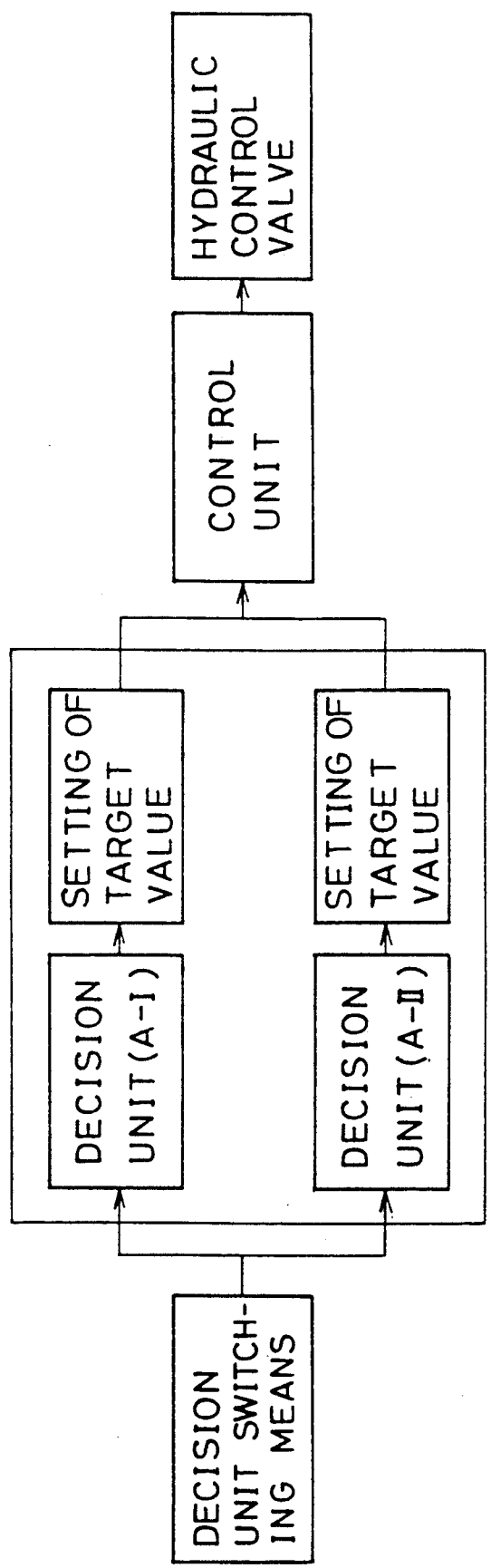
FIG. 6 is a block diagram showing a variation of an embodiment of the present invention.

It is further to be noted that the present invention can be practiced in such an embodiment as shown in FIG. 6 where a plurality of decision units (A-I) and (A-II), for example, are provided so as to be selectively switched from each other by means of a switch unit (C) for operatively switching the plural decision units, in addition to the embodiment as described hereinabove in detail. In such an alternative embodiment, an optimum control characteristic can be selected for example by shifting the decision units (A-I) and (A-II) in accordance with the destination or the like. Further, the reading of the data stored in the ROM can be changed or replaced in accordance with the destination, the characteristics of the vehicle so that the decision unit can be operated in a substantially different fashion. In other words, an accurate selection of the control characteristics can be made in accordance with the destination, the characteristics of the vehicle and so on, by appropriately replacing or changing the decision unit.

It is to be understood that the foregoing text and drawings relate to embodiments of the invention given by way of examples but no limitation. Various other embodiments and variants are possible within the spirit and scope of the present invention.

What is claimed is:

1. A drive control system of a four-wheel drive vehicle having a differential device interposed between front and rear wheels and a differential restricting device mounted to said differential device for restricting a differential action of said differential device, comprising:
    a target slip ratio setting means for setting a target slip ratio of a wheel so that a slip ratio can be utilized as a control target value in controlling the four-wheel driving vehicle;
    a conversion means for converting the target slip ratio set by said target slip ratio setting means into a target rotational speed difference between the front and rear wheels in order to prevent a delay in performing and control;
    a detecting means for detecting a rotational speed difference between the front and rear wheels; and
    a feedback control means for controlling said differential restricting device so to cause said rotational speed difference between the front and rear wheels detected by said detection means to reach said target rotational speed difference between the front and rear wheels.

2. A drive control system as claimed in claim 1, further comprising a running situation detecting means for detecting a running situation of the vehicle; and
    wherein said target slip ratio setting means is to set the target slip ratio in accordance with the running situation of the vehicle in response to a signal from said running situation detecting means.

3. A drive control system as claimed in claim 1, wherein a decision unit and a control unit are provided independently from each other, said decision unit comprising said target slip ratio setting means and said conversion means and said control unit comprising said feedback control means; and
    said control unit performs feedback control on the basis of the target rotational speed difference between the front and rear wheels in response to the target rotational speed difference between the front and rear wheels from said decision unit.

4. A drive control system as claimed in claim 2, wherein a decision unit and a control unit are provided independently from each other, said decision unit comprising said running situation detecting means, said target slip ratio setting means and said conversion means and said control unit comprising said feedback control means comprised of routines; and
    and said control unit performs feedback control on the basis of the target rotational speed difference between the front and rear wheels in response to the target rotational speed difference between the front and rear wheels from said decision unit, in each cycle of an output of a manipulated variable of the control unit.

5. A drive control system as claimed in claim 4, further comprising a plurality of decision units each of which has a different characteristic setting said target slip ratio; and
    a decision unit switching means for selectively switching said plurality of decision units.

6. A drive control system of a four-wheel drive vehicle having a differential device interposed between front and rear wheels and a differential restricting device mounted to said differential device for restricting a differential action of said differential device, comprising:
    detection means for detecting a rotational speed difference between the front and rear wheels comprising a running situation detecting means for providing a signal indicative of a running situation of the vehicle;
    target slip ratio setting means for setting a target slip ratio of a wheel in accordance with said signal indicative of a running situation of the vehicle, and comprising an upper and lower limit value setting means for setting an upper limit value and a lower limit value of the target slip ratio;
    conversion means for converting the target slip ratio into a target rotational speed difference between the front and rear wheels, and comprising means for converting said target slip ratio upper limit and lower limit values into an upper limit value and a lower limit value, respectively of said target rotational speed difference;
    feedback control means for controlling said differential restricting device so that said rotational speed difference is changed to the target rotational speed difference;
    a decision unit comprising said detection means, said target slip ratio setting means and said conversion means; and
    a control unit comprising said feedback control means comprised of routines, whereby said control unit performs feedback control, in response to the target rotational speed difference from said decision unit, in each cycle of an output of a manipulated variable of the control unit.

7. A drive control method for a four-wheel drive vehicle having a differential device interposed between front and rear wheels and a differential restricting device mounted to said differential device for restricting a differential action of said differential device, comprising the steps of:

setting a target slip ratio of a wheel;

converting the target slip ratio into a target rotational speed difference between the front and rear wheels;

detecting a rotational speed difference between the front and rear wheels; and controlling said differential restricting device by means of a feedback control to cause said detected rotational speed difference to change to said target rotational speed difference.

8. A drive control system of a four-wheel drive vehicle having a differential device interposed between front and rear wheels and a differential restricting device mounted to said differential device for restricting a differential action of said differential device, comprising:

target slip ratio setting means for setting a target slip ratio of a wheel as a function of an operating condition of the vehicle;

conversion means for converting the target slip ratio into a target rotational speed difference between the front and rear wheels;

detection means for detecting a rotational speed difference between the front and rear wheels; and feedback control means for controlling said differential restricting device so that said rotational speed difference is changed to the target rotational speed difference.

* * * * *